March 6, 1962   G. A. BURKLUND ETAL   3,024,415
EXPANDED-SCALE R.M.S. METER WITH HARMONIC COMPENSATION
Filed Feb. 2, 1959   2 Sheets-Sheet 1

INVENTORS
GLENN A. BURKLUND
DAREL R. DELLINGER
Alexander & Dowell
ATTORNEYS

INVENTORS
GLENN A. BURKLUND
DAREL R. DELLINGER

United States Patent Office 3,024,415
Patented Mar. 6, 1962

3,024,415
EXPANDED-SCALE R.M.S. METER WITH HARMONIC COMPENSATION
Glenn A. Burklund, Fairfax, and Darel R. Dellinger, Alexandria, Va., assignors to American Machine & Foundry Company, a corporation of New Jersey
Filed Feb. 2, 1959, Ser. No. 790,549
16 Claims. (Cl. 324—131)

This invention relates to A.C. voltmeters, and more particularly relates to improved low-drain rectifier meter circuits of the suppressed-zero type wherein the meter circuit is also provided with means for reducing errors in the R.M.S. readings caused by the presence of harmonics in the input to the meter circuit.

It is the primary object of the invention to provide an improved suppressed-zero voltmeter circuit employing zener reference elements connected as voltage regulators in a novel bridge circuit such that the loading by the voltmeter circuit on the potential source is materially reduced as compared with prior-art bridge circuits, this reduction in loading being accomplished by means of two branches in the voltmeter circuit, which branches are respectively connected in series opposition and then in series with the meter so that substantially no current flows between the two branches when the meter is reading zero and only a small current flows therebetween when the meter reads up-scale. In many prior-art measuring systems the meter is connected in a bridge circuit to measure unbalance of the bridge, and the result is that even when the meter reads zero, meaning no unbalance of the bridge, a considerable current is flowing through the legs of the bridge and thus unnecessarily loading the source of potential being measured.

It is another primary object of the present invention to provide novel circuits in which errors in the R.M.S. meter readings caused by the presence of harmonics in the input are reduced to a minimum. In particular, it is an object of the invention to provide in the same voltmeter circuit the combined features of suppressed-zero meter action and compensation for the presence of harmonics in the potential being measured. There are types of meters other than rectifier meters which can be used to read R.M.S. voltages with considerable accuracy, i.e. a thermocouple meter accurately reads R.M.S. values in the presence of harmonics. However, the thermocouple meter does not lend itself to use where suppressed-zero meter action is desired, this being especially true where zener reference elements are employed in the zero-suppression circuit. A thermocouple meter operates at extremely low signal levels well below the range of operation of zener elements and therefore the two can not be combined in a single meter. It is an important object of this invention to provide a meter circuit in which suppressed-zero meter action and harmonic compensation can be successfully combined.

In the case of an ordinary half-wave rectifier-type R.M.S. meter the second harmonic generally causes the greatest disturbance from the point of view of accuracy of meter readings. However, as is well-known in the art, the damaging effect of even harmonics can be reduced by using a full-wave rectifier circuit, and in this type of circuit the most damaging disturbance will generally be caused by the third harmonic. The present circuit takes advantage of this fact by employing full-wave rectification in its main branch.

In addition, the phases of the harmonics with reference to the phase of the fundamental wave greatly affect the amount of error in R.M.S. meter readings attributable to harmonics. This fact at least partially accounts for the reason why accuracy is generally improved when the harmonics are all simply filtered out of the input wave form. This is especially true where the percentages of the harmonics are relatively small as compared with the amplitude of the fundamental. In one of the two circuits shown in the present drawings, the harmonics are simply filtered out and disregarded, but in the other circuit a correction voltage is developed which depends upon the magnitude of the harmonics and which voltage is introduced into the meter circuit to compensate the R.M.S. readings thereof.

It is a major object of this invention to provide in a meter circuit harmonic compensation which automatically accounts for the phase relationship between the fundamental and the complex form attributable to the harmonic content.

It is a further important object of the invention to provide in one branch of the meter circuit a filter designed to pass the fundamental and to block the harmonics from the rectifier, the filter being terminated in its own characteristic impedance so that the pass characteristic of the filter will be substantially constant in the vicinity of the nominal frequency for which the meter is designed, whereby errors in the meter readings due to divergence of the fundamental from said nominal frequency will be minimized over a fairly wide band of input frequencies.

It is another object of the invention to provide an additional compensating branch of the meter circuit which includes an elimination filter designed to block the fundamental from this additional branch but to pass the harmonics therethrough, this branch like the other branches of the meter circuit being energized by various secondary windings of the same transformer, the primary winding of which is excited by the source of potential being measured. In the above-mentioned compensating branch of the voltmeter circuit only the harmonics are rectified and a resulting unidirectional compensating voltage is obtained at the output of the rectifier which compensating voltage is proportional to the harmonic content and follows the phase relationship of the complex wave form of the harmonics. The compensating voltage from this branch is then introduced back into the main measuring branch of the meter circuit and is added to the rectifier current therein to produce a composite current representing the true R.M.S. value of the voltage being measured at the source of potential.

The presence of the elimination filter in the compensating branch considerably narrows the frequency range in which the meter may be used, but at the same time increases the accuracy of the meter when used at the proper nominal frequency. In power measurements, this greater dependence on frequency within reasonable limits is really not a limitation of practical importance.

Other objects and advantages of the present invention will become apparent during the following discussion of the drawings wherein.

Figure 1:
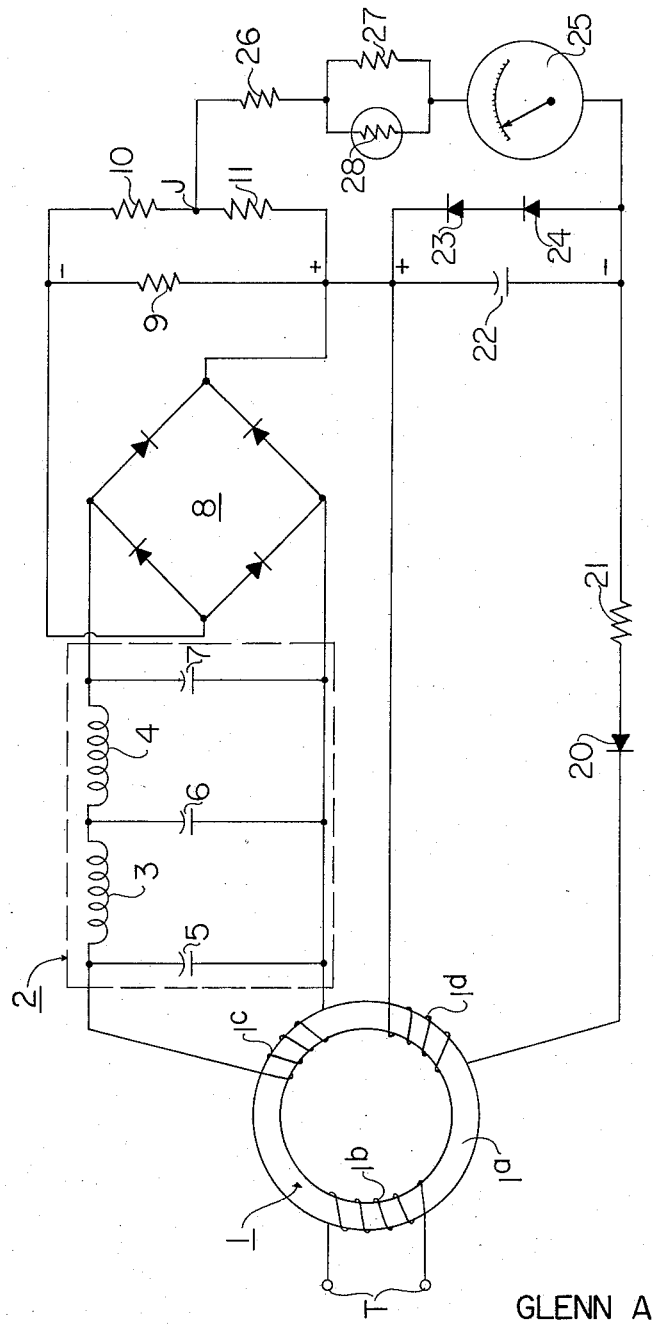
FIG. 1 is a schematic diagram of an R.M.S. voltmeter circuit having a suppressed-zero meter action and having a circuit for eliminating the effects of harmonics contained in the input potential to the meter.

Referring now to FIG. 1 the voltmeter circuit shown therein comprises a transformer 1 having a core 1a and having a primary winding 1b connected with input terminals T at which the A.C. potential to be measured is applied to the voltmeter circuit. The transformer also has multiple secondary windings 1c and 1d. The core of the transformer actually employed in constructing the present voltmeter circuit is made of powdered iron in order to provide good high-frequency response. An additional very important advantage to be gained by using powdered iron lies in the fact that the core losses are very small and therefore the warm-up time of the instrument is substantially eliminated. In actual practice this voltmeter circuit is potted in plastic and thus it is very important that the components provide very small losses so as to avoid the lengthy delay which would otherwise precede stable operation of the voltmeter if higher loss components were employed and the meter therefore required a considerable length of time to arrive at thermal stability.

The voltmeters manufactured at the present time according to the circuits shown in the drawings are designed to measure the voltage across a 400 cycle power supply line and therefore the harmonics can involve fairly high audio frequencies. It is accordingly important that the transformer have good frequency response. The output voltage of the secondary windings 1c and 1d is in the present meters approximately 20 volts when the meter is used for 117 volt 400 cycle input measurements.

The secondary windings 1c and 1d are insulated from each other with respect to direct current components and respectively energize different branches of the voltmeter circuit. The upper secondary winding 1c is connected with a filter 2 which includes inductances 3 and 4 and capacitors 5, 6 and 7, these inductors and capacitors being connected to form a well-known low-pass filter network which is designed to pass the fundamental wave but to strongly attenuate the harmonics thereof. The cut-off frequency of this filter is, therefore, somewhat above the fundamental frequency, and the filter is terminated in its characteristic impedance so that in the vicinity of the nominal 400 cycle input frequency applied to the filter 2, its output amplitude is substantially constant.

The output of the filter 2, comprising substantially only the fundamental frequency of 400 cycles, is applied to a full-wave rectifier 8 the output of which is applied across a load resistance 9 with the polarity shown on the circuit diagram of FIG. 1. The load resistor 9 is shunted by a voltage divider comprising resistances 10 and 11 which supply an output voltage at point J to the series circuit of a direct current meter 25, as will be hereinafter explained. It is important to note that the resistance 9 and the resistances 10 and 11 when taken with the resistance of the direct current meter circuit form a composite load on the filter 2 which is substantially equal to the characteristic impedance of that filter.

The secondary winding 1d of the transformer 1 also supplies approximately 20 volts to a suppressed-zero circuit which comprises a half-wave rectifier diode 20 connected in series with a current limiting resistor 21. This rectifier circuit supplies a D.C. component across a ripple smoothing condenser 22 of the polarity shown on the diagram of FIG. 1. Across the condenser 22 are connected in series two zener reference elements 23 and 24, which zener elements serve the purpose of maintaining the voltage across the condenser 22 regulated to a constant value. Each of the zener reference elements 23 and 24 is a 7-volt unit, and therefore the two reference elements in series regulate the voltage across the condenser 22 to a constant 14 volts with the polarity as shown. It is important to note that the polarity across the condenser 22 is opposite to the polarity across the load resistance 9 and is connected in series therewith. The remaining portion of the voltmeter circuit comprises a series circuit including direct-current meter 25 which in the practical embodiment of the present instrument is a 0–200 microammeter, and this meter is connected in series with a calibrating resistance 26 and a meter temperature compensating circuit comprising a resistor 27 connected in parallel with a temperature compensating resistor 28 to produce the necessary resistance characteristics to exactly compensate the temperature variations in the resistance of the meter circuit, in a manner known per se.

The voltage appearing across the condenser 22 as stated above is regulated to 14 volts. In the absence of loading the voltage appearing across the load resistor 9 would be 20 volts, but because of the loading by the terminating network of the filter 2, this voltage is reduced somewhat below 20 volts. The values of the voltage divider resistances 10 and 11 are chosen such that when the input to the voltmeter circuit across the terminals T is at the minimum voltage which the meter is intended to indicate, the voltage at the junction point J between the resistances 10 and 11 will be 14 volts, and therefore no current will flow through the meter 25 and the resistances 26, 27, 28. Therefore, the meter will read zero microamperes, but will be calibrated in terms of the low end, 115 volts, of the expanded voltage range over which meter readings are to be indicated.

By adjusting the resistance 10 the low-end reading of the meter 25 can be calibrated.

By adjusting the resistance 26, the full-scale reading of the meter 25, 125 volts, can be calibrated.

Figure 2:
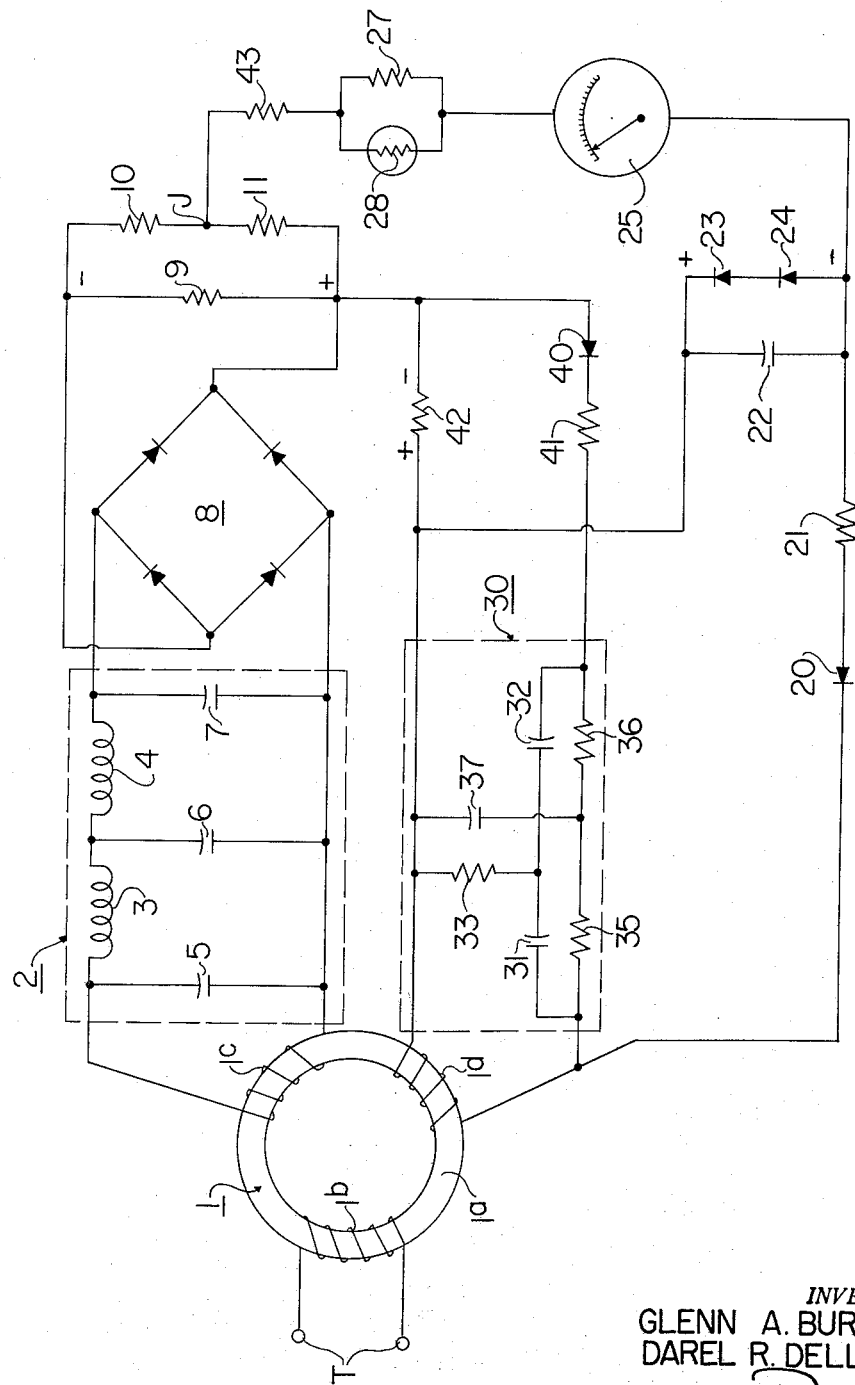
FIG. 2 is a schematic diagram of an R.M.S. voltmeter circuit having a suppressed-zero and having a compensating circuit for introducing a corrective current into the meter designed to compensate the meter reading to approach as closely as possible the true R.M.S. value of the input potential including the harmonics present in the input potential.

The circuit shown in FIG. 2 is similar to that shown in FIG. 1, and includes most of the components of FIG. 1, similar components in the two circuits being marked with similar reference characters. FIG. 2 includes the transformer 1 having input terminals T and having two secondary windings, the winding 1c being connected with the input to the low pass filter 2 and the output of this filter being connected with a full-wave rectifier which supplies unidirectional potentials to the loading network comprising the resistances 9, 10 and 11. The suppressed-zero branch of the circuit is the same as that shown in FIG. 1 and derives its power from the secondary winding 1d. This winding is connected with a rectifier 20 and a current limiting resistance 21 and furnishes a unidirectional voltage across the filter condenser 22 which voltage is regulated to 14 volts by the zener reference elements 23 and 24. The voltage across the reference elements is connected in series opposition with the voltage across the voltage divider comprising resistances 10 and 11, and these voltages are connected in series with the circuit of the meter 25 as in the case of FIG. 1.

However, in FIG. 2 there is a harmonic correction circuit which includes an elimination filter 30 comprising a twin-T network 30 including capacitors 31 and 32 connected with a shunt resistance 33 and including in the other T the series resistors 35 and 36 and a shunt capacitor 37. The values of these network capacitors and resistors are selected such that the twin-T network eliminates the 400 cycle fundamental, but passes the harmonics thereof to a circuit including a rectifier 40 and two resistances 41 and 42 in series therewith. The resistances 41 and 42 together form the current limiting resistance for the rectifier 40, and the resistance 42 is also connected in series between the divider resistances 10 and 11 in the upper branch and the output of the zero-suppression network in the lower branch, this output appearing across the zener reference elements 23 and 24. The value of the resistance 26 in FIG. 1 has to be reduced by the value of the resistance 42 in FIG. 2 and to a new value comprising resistance 43.

The fundamental elimination-filter 30 is driven from the winding 1d of the transformer 1 and supplies a complex wave form to the rectifier 40 and load resistances 41 and 42 which complex wave form bears a definite phase relationship with the phase of the fundamental in the upper branch derived from transformer winding 1c. It will be seen that the voltage across the resistance 42 is in series between the two branches of the meter circuit and of such polarity as to be additive with the voltage in the upper branch. In other words, when all harmonics are filtered out and eliminated from a rectifier-type R.M.S. voltmeter, the meter tends to read low, and therefore when inserting a correction voltage designed to cause the meter to read somewhat higher and therefore closer to the composite R.M.S. value of both the fundamental and the harmonics, it is necessary that the correction voltage which is actually inserted be additive with the voltage of the main measuring circuit.

According to data taken from actual manufactured models made in accordance with the present circuit, the accuracy of the R.M.S. meter readings is greatly improved by the inclusion of the harmonic correction circuit shown in FIG. 2.

The following table provides a list of practical values for the circuit components shown in FIGS. 1 and 2 for the purpose of disclosing a practical embodiment of each of these circuits:

| Component | Value |
| --- | --- |
| Transformer 1, powdered iron core | 1 henry primary winding. |
| Inductances 3 and 4 | .5 henry. |
| Condensers 5 and 7 | .1 microfarad. |
| Condenser 6 | .25 microfarad. |
| Rectifier diodes of bridge 8 | General Electric IN537. |
| Diodes 20 and 40 | General Electric IN537. |
| Resistance 9 | 2000 ohms. |
| Resistance 10 | 500 ohms. |
| Resistance 11 | 3600 ohms. |
| Resistances 21 and 26 | 1500 ohms. |
| Capacitor 22 | 10 microfarads. |
| Zener reference elements 23 and 24 | Transitron Co. type SV7. |
| Meter 25 | 0–200 D.C. microamperes. |
| Resistance 27 | 680 ohms. |
| Resistance 28, Keystone Carbon Co. | 750 ohms at 38° C. |
| Capacitors 31 and 32 | .2 microfarad. |
| Resistance 33 | 1000 ohms. |
| Resistances 35 and 36 | 2000 ohms. |
| Capacitor 37 | .4 microfarad. |
| Resistance 41 | 1800 ohms. |
| Resistance 42 | 1000 ohms. |
| Resistance 43 | 500 ohms. |

The present invention is not to be limited to the exact forms shown in the drawings, for obviously changes may be made within the scope of the following claims.

We claim:

1. An A.C. voltmeter circuit comprising a meter; a transformer having a primary winding to be connected across the source of potential being measured and having multiple secondary windings furnishing voltages to different secondary circuits; a first rectifier in the first secondary circuit and delivering a first unidirectional voltage proportional to the potential across the primary winding; a second rectifier in the second secondary circuit and delivering a second unidirectional voltage; and voltage regulator means connected to the second rectifier and regulating said second voltage to a constant value, and the secondary circuits being connected in series with said meter with their polarities in series opposition whereby the regulated second voltage subtracts a constant value from said first unidirectional voltage to provide suppressed-zero meter action.

2. An A.C. voltmeter circuit to be connected with a source of potential to be measured comprising a meter; a first rectifier circuit comprising a first rectifier connected to receive power from said source and delivering a first unidirectional voltage proportional to the potential of the source; a second rectifier circuit comprising a second rectifier connected to receive power from said source and delivering a second unidirectional voltage; and voltage regulator means connected to the second rectifier and regulating said second voltage to a constant value, and the two rectifier circuits being connected in series with said meter with their polarities in series opposition whereby the regulated second voltage subtracts a constant value from said first unidirectional voltage to provide suppressed-zero meter action.

3. An A.C. voltmeter circuit comprising a meter; a transformer having a primary winding to be connected across the source of potential being measured and having multiple secondary windings furnishing voltages to different secondary circuits; a first filter in the first secondary circuit connected with a secondary winding and passing only the input fundamental; a first rectifier connected with the first filter and delivering a first unidirectional voltage proportional to the potential across the primary winding; a second rectifier in the second rectifier circuit and delivering a second unidirectional voltage; and voltage regulator means connected to the second rectifier and regulating said second voltage to a constant value, and the secondary circuits being connected in series with said meter with their polarities in series opposition whereby the regulated second voltage subtracts a constant value from said first unidirectional voltage to provide suppressed-zero meter action.

4. An A.C. voltmeter circuit comprising a meter; a transformer having a primary winding to be connected across the source of potential being measured and having a secondary winding; a filter connected with the secondary winding and passing only the input fundamental; a first rectifier connected with the filter and delivering a first unidirectional voltage proportional to the potential across the primary winding; first load resistance means connected across the first rectifier; a second rectifier connected to receive power from said source and delivering a second unidirectional voltage; voltage regulator means connected across the output of said second rectifier and regulating said second voltage to a constant value; and second load resistance means connected across said regulator means, the two load resistance means being connected in series with said meter and with the voltage polarities in series opposition whereby the regulated second voltage subtracts a constant value from said first unidirectional voltage to provide suppressed-zero meter action.

5. An A.C. voltmeter circuit comprising a meter; a transformer having a primary winding to be connected across the source of potential being measured and having secondary windings furnishing voltages to different secondary circuits; a first secondary circuit comprising a first output impedance, a first rectifier delivering a first unidirectional voltage to said output impedance, and a harmonic elimination filter connected between the associated secondary winding and said first rectifier; and a harmonic correction circuit comprising a second output impedance, a second rectifier delivering a second unidirectional voltage to said second output impedance, and a fundamental-elimination filter connected between another secondary winding and said second rectifier, said first and second output impedances being connected in series with said meter and the reading of the meter equaling the sum of the first unidirectional voltage representing the fundamental and the second unidirectional voltage representing the harmonics.

6. In a voltmeter as set forth in claim 5, said first rectifier being a full-wave rectifier; and said second rectifier being a half-wave rectifier.

7. In a voltmeter as set forth in claim 5, said filters being terminated with their characteristic impedances and preserving the harmonic-to-fundamental phase relation between the output voltages substantially the same as the relation between input potentials.

8. An A.C. voltmeter circuit to be connected with a source of potential to be measured comprising a meter; a first circuit comprising a first output impedance, a first rectifier delivering a first unidirectional voltage to said output impedance, and a harmonic elimination filter connected with said first rectifier and connected to receive power from said source; and a harmonic correction circuit comprising a second output impedance, a second rectifier delivering a second unidirectional voltage to said second output impedance, and a fundamental-elimination filter connected with said second rectifier and connected to receive power from said source; and said first and second output impedances being connected in series with said meter, the reading of the meter equaling the sum of the first unidirectional voltage representing the fundamental and the second unidirectional voltage representing the harmonics.

9. In a voltmeter circuit as set forth in claim 8, a transformer having a primary winding to be connected to said source and having at least one secondary winding furnishing power to at least one of said circuits.

10. In a voltmeter as set forth in claim 8, said first rectifier being a full-wave rectifier; and said second rectifier being a half-wave rectifier.

11. An A.C. voltmeter circuit comprising a meter; a transformer having a primary winding to be connected across the source of potential being measured and having multiple secondary windings furnishing voltages to different secondary circuit; a first filter in the first secondary circuit connected with a secondary winding and passing only the input fundamental; a first rectifier connected with the first filter and delivering a first unidirectional voltage proportional to the potential across the primary winding; a second rectifier in the second secondary circuit and delivering a second unidirectional voltage; voltage regulator means in the second secondary circuit and regulating said second voltage to a constant value, the first and second secondary circuits being connected with their polarities in series opposition and across said meter whereby the regulated second voltage subtracts a constant value from said first unidirectional voltage to provide suppressed-zero meter action; and harmonic compensating means comprising an elimination filter connected to a secondary winding and blocking the fundamental but passing harmonics; an output impedance; and a third rectifier connected between said impedance and the elimination filter and delivering across said impedance a third unidirectional voltage proportional to said harmonics, the output impedance being connected in series with the first and second secondary circuits for correcting the reading of the meter in proportion to said harmonics.

12. In a voltmeter as set forth in claim 11, said first rectifier being a full-wave rectifier; and said third rectifier being a half-wave rectifier.

13. In a voltmeter as set forth in claim 11, said filters being terminated with their characteristic impedances and preserving the harmonic-to-fundamental phase relation between the output voltages substantially the same as the relation between input potentials.

14. An A.C. voltmeter circuit to be connected with a source of potential to be measured comprising a meter; a first circuit comprising a first filter connected to receive power from said source and passing only the input fundamental; a first rectifier connected to the first filter and delivering a first unidirectional voltage proportional to the potential across the source; a second circuit comprising a second rectifier connected to receive power from said source and delivering a second unidirectional voltage; voltage regulator means connected to said second rectifier and regulating said second voltage to a constant value, the first and second circuits being connected across said meter with their polarities in series opposition whereby the regulated second voltage subtracts a constant value from said first unidirectional voltage to provide suppressed-zero meter action; and a third circuit comprising an elimination filter connected to receive power from said source and blocking the fundamental but passing harmonics; an output impedance; and a third rectifier connected between said impedance and the elimination filter and delivering across said impedance a third unidirectional voltage proportional to said harmonics, the output impedance being connected in series with said first and second circuits for correcting the reading of the meter in proportion to said harmonics.

15. In a voltmeter as set forth in claim 14, said first rectifier being a full-wave rectifier; and said third rectifier being a half-wave rectifier.

16. In a voltmeter as set forth in claim 14, a transformer having a primary winding to be connected to said source and having at least one secondary winding furnishing power to at least one of said circuits.

References Cited in the file of this patent

UNITED STATES PATENTS

| | | |
|---|---|---|
| 2,269,227 | Rowell | Jan. 6, 1942 |
| 2,329,528 | Grave | Sept. 14, 1943 |
| 2,522,369 | Guanella | Sept. 12, 1950 |
| 2,522,914 | Winchel | Sept. 19, 1950 |

FOREIGN PATENTS

| | | |
|---|---|---|
| 651,941 | Germany | Oct. 22, 1937 |
| 118,170 | Sweden | Feb. 18, 1947 |